United States Patent
Rakshit

(10) Patent No.: US 11,378,942 B2
(45) Date of Patent: Jul. 5, 2022

(54) PROGRESSIVE GUIDANCE OF DIGITAL TWIN MODEL ASSEMBLY

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 462 days.

(21) Appl. No.: 16/687,900

(22) Filed: Nov. 19, 2019

(65) Prior Publication Data
US 2021/0149380 A1 May 20, 2021

(51) Int. Cl.
*G05B 19/418* (2006.01)
*G06F 3/01* (2006.01)
*H04L 67/10* (2022.01)

(52) U.S. Cl.
CPC ........ *G05B 19/41875* (2013.01); *G06F 3/011* (2013.01); *G06F 3/016* (2013.01);
(Continued)

(58) Field of Classification Search
CPC .... G05B 19/41875; G05B 2219/32181; G05B 2219/32368; G05B 2219/40111; G05B 19/401; G05B 19/40936; G05B 19/4183; G05B 19/41885; G05B 19/4207; G05B 2219/37063; G05B 2219/37194; G05B 2219/37198; G05B 2219/37208;
(Continued)

(56) References Cited

U.S. PATENT DOCUMENTS 8,982,156 B2    3/2015  Maggiore
2016/0328883 A1* 11/2016 Parfenov ............... G06T 19/006
(Continued)

FOREIGN PATENT DOCUMENTS

GN   104504175 A    4/2015
WO   2016065492 A1  5/2016

OTHER PUBLICATIONS

Tao et al., Digital twin-driven product design framework, Feb. 25, 2018, International Journal of Production Research, p. 1-19 (Year: 2018).*

(Continued)

*Primary Examiner* — Kidest Bahta
(74) *Attorney, Agent, or Firm* — Mark Bergner

(57) ABSTRACT

A computer-implemented system and method for searching comprises receiving digital twin instance part assembly information (IPAD) from a sensor scan of a physical part assembly produced by assembling a first physical part with a second physical part. Digital twin framework part assembly data (FPAD) is received representing a correctly assembled physical part assembly and that corresponds to the physical part assembly. Context data associated with a context within which the physical part assembly is produced is also received. The FPAD is compared with the IPAD, utilizing the context data, to determine whether a deviation of the IPAD from the FPAD exceeds a threshold. Responsive to the deviation exceeding a threshold, the method comprises providing corrective information to a device of an assembler for re-assembling the first physical part to the second physical part to produce a reassembled physical part assembly based on the corrective information.

20 Claims, 6 Drawing Sheets

(52) U.S. Cl.
CPC ............. *G05B 2219/32368* (2013.01); *G05B 2219/40111* (2013.01); *H04L 67/10* (2013.01)

(58) Field of Classification Search
CPC .......... G06F 3/011; G06F 3/016; H04L 67/10; Y02P 90/02
See application file for complete search history.

(56) References Cited

U.S. PATENT DOCUMENTS

| | | | | |
|---|---|---|---|---|
| 2017/0286572 | A1* | 10/2017 | Hershey | ................... B64F 5/60 |
| 2018/0131907 | A1* | 5/2018 | Schmirler | .......... H04N 5/23238 |
| 2018/0180085 | A1 | 6/2018 | Watanabe et al. | |
| 2018/0336729 | A1* | 11/2018 | Prideaux-Ghee | ....... G06F 3/011 |

OTHER PUBLICATIONS

Qiu et al., Digital assembly technology based on augmented reality and digital twins: a review, Oct. 28, 2019, Virtual reality & intelligent hardware vol. 1 Issue 6, p. 597-610. (Year: 2019).*

Cai, et al., Sensor data and information fusion to construct digital-twins virtual machine tools for cyber-physical manufacturing, 2017, 45th SME North American Manufacturing Research Conference, p. 1031-1042. (Year: 2017).*

Kennedy, K., "What is Digital Twins (+Impact on Business Modernization)," G2 Digital Trends, Jan. 18, 2018, 10 pgs. https://blog.g2crowd.com/blog/trends/internet-of-things/2018-iot/digital-twins/.

Mevea, "How can Digital Twin technology improve your business?—Digital Twin explained," You Tube, Oct. 11, 2018, 2 pgs. https://www.youtube.com/watch?v=YqTL8dwYT54.

VTT, "Augmented Assembly—Increasing efficiency in assembly work with Augmented Reality," You Tube, May 9, 2010, 2 pgs. https://www.youtube.com/watch?v=vOhiZ37aaww.

Syberfeldt et al., "Visual Assembling Guidance Using Augmented Reality," Procedia Manufacturing, vol. 1, 2015, pp. 98-109, 43rd Proceeding of the North American Manufacturing Research Institution of SME, Elsevier. https://www.sciencedirect.com/science/article/pii/S2351978915010689.

Rentzos et al., "Augmented Reality for Human-based Assembly: Using Product and Process Semantics," 12th IFAC Symposium on Analysis, Design, and Evaluation of Human-Machine Systems, Aug. 2013, pp. 98-101. https://www.sciencedirect.com/science/article/pii/S1474667016330518.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

PROGRESSIVE GUIDANCE OF DIGITAL TWIN MODEL ASSEMBLY

BACKGROUND

The use of digital twin information to assist in assembly processes related to the manufacture of parts has advanced in recent years. However, not all of the parameters that may be helpful during the assembly process have historically been made available.

SUMMARY

According to one aspect disclosed herein, a computer-implemented method comprises receiving digital twin instance part assembly information (IPAD) from a sensor scan of a physical part assembly produced by assembling a first physical part with a second physical part. Digital twin framework part assembly data (FPAD) is received representing a correctly assembled physical part assembly and that corresponds to the physical part assembly. Context data associated with a context within which the physical part assembly is produced is also received. The FPAD is compared with the IPAD, utilizing the context data, to determine whether a deviation of the IPAD from the FPAD exceeds a threshold. Responsive to the deviation exceeding a threshold, the method comprises providing corrective information to a device of an assembler for re-assembling the first physical part to the second physical part to produce a reassembled physical part assembly based on the corrective information.

According to another aspect disclosed herein, a part assembly system is provided, comprising a processor configured to receive digital twin instance part assembly information (IPAD) from a sensor scan of a physical part assembly produced by assembling a first physical part with a second physical part. Digital twin framework part assembly data (FPAD) representing a correctly assembled physical part assembly and that corresponds to the physical part assembly is also received, as is context data associated with a context within which the physical part assembly is produced. The processor compares the FPAD with the IPAD, utilizing the context data, to determine whether a deviation of the IPAD from the FPAD exceeds a threshold. Responsive to the deviation exceeding a threshold, the processor provides corrective information to a device of an assembler for re-assembling the first physical part to the second physical part to produce a reassembled physical part assembly based on the corrective information.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Figure 1:
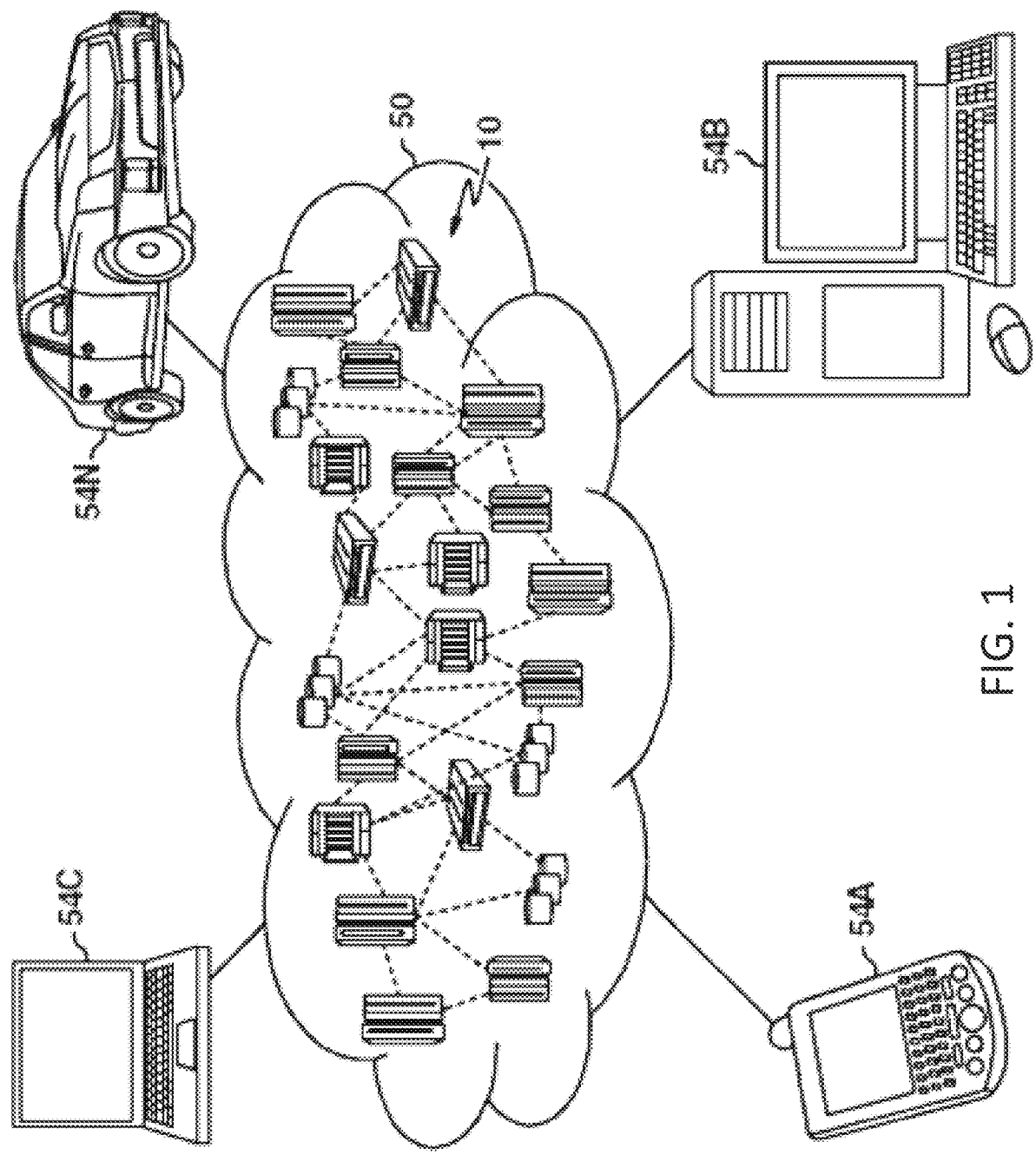
FIG. 1 depicts a cloud computing environment according to an embodiment of the present invention.

A digital twin system may be utilized during an assembly process of a machine or component manufacture to ensure that potential assembly problems are caught early on in the process. Various sensors monitor the assembly process for a particular instance of an assembly at a particular step in the process. The scanned result of the instance are compared against a "correct" template of the expected assembly at that particular state, and variances, based on threshold values, are indicated to the assembler so that problems may be fixed at the point they are created and/or detected.

The following acronyms may be used below:
API application program interface
ARM advanced RISC machine
CD-ROM compact disc ROM
CMS content management system
CoD capacity on demand
CPU central processing unit
CUoD capacity upgrade on demand
DPS data processing system
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
PaaS platform as a service
PDA personal digital assistant
PLA programmable logic arrays
RAM random access memory
RISC reduced instruction set computer ROM read-only memory
SaaS software as a service
SLA service level agreement
SRAM static random-access memory
WAN wide-area network Cloud Computing in General It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
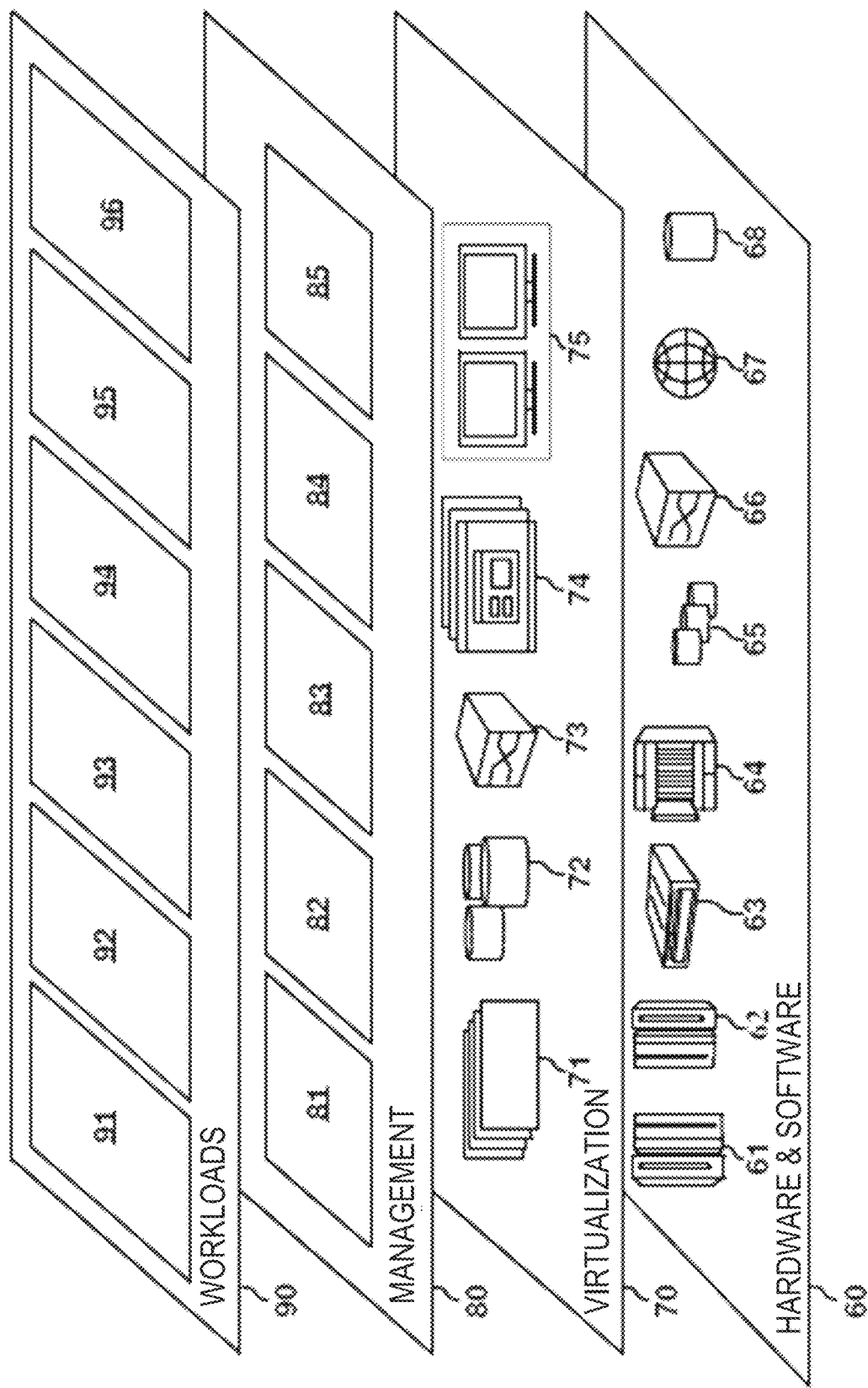
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Data Processing System in General

Figure 3:
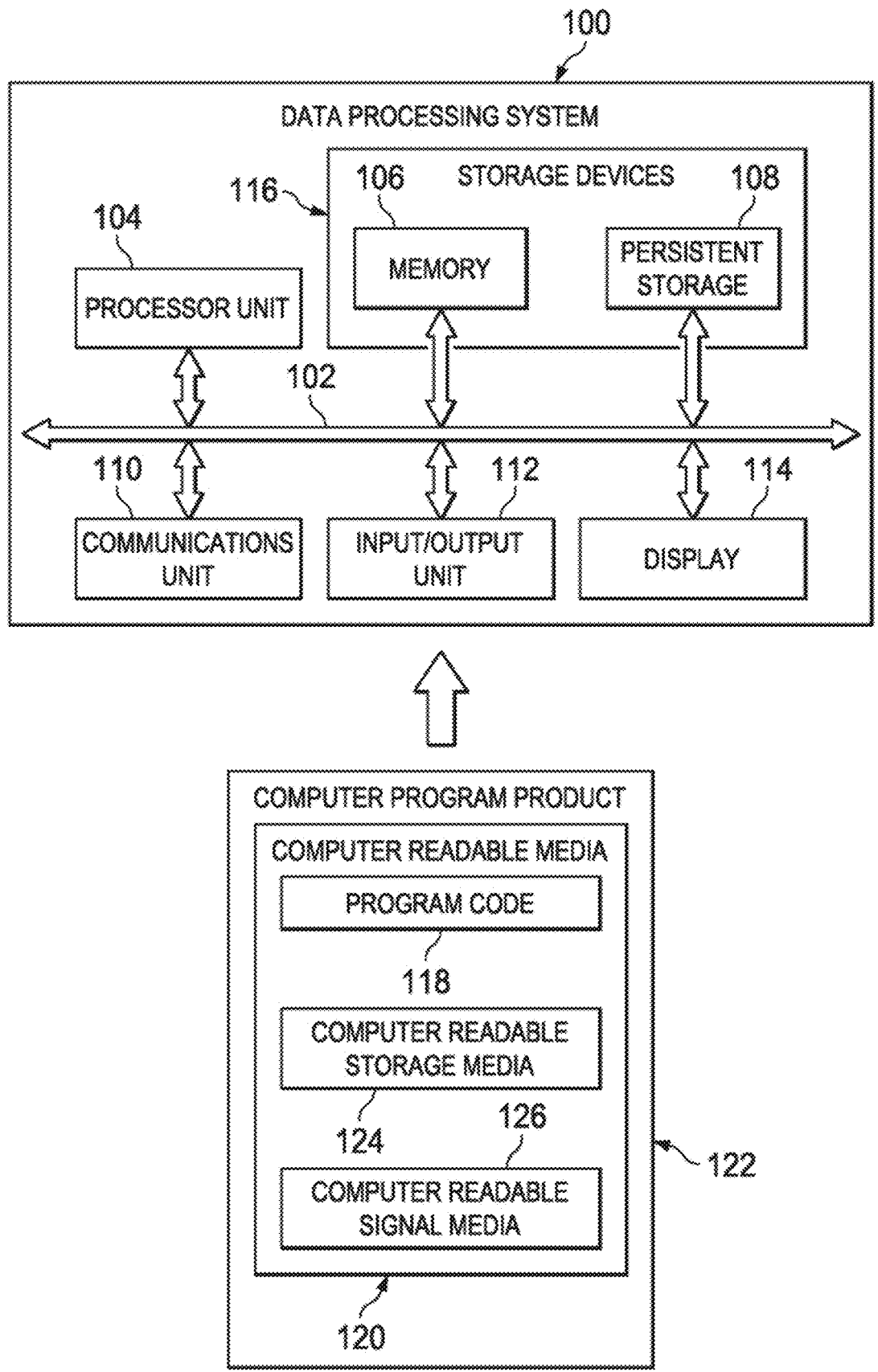
FIG. 3 is a block diagram of a DPS according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100.

Digital Twin System

The disclosure herein describes a digital twin model system. A digital twin model is designed to be an exact replicate of physical object, and may contain information that makes it act, in a simulation as its corresponding physical object. A digital twin model may be an exact replica of the physical working model. It may be used to simulate an exact situation, and produce a result as it is done by physical twin. While assembling a machine or repairing it, using the BOM and identified machine detail, the existing system may identify which machine parts are to be assembled and a sequence of the assembling. When partial assembling is done, then camera and IoT system may identify how the physical assemble is to be done. On real-time basis, the proposed digital twin computation system may identify which machine parts are already assembled and which are still remaining. The digital twin computing system may identify how the physical assembling is done, in this case, the digital twin computing system can gather IoT feed from the tools used during assembly, as well as an IoT feed from the machine parts which are assembled.

The system may simulate the remaining unassembled portion, using digital twins, of the machine parts and may show an expected end result of a particular assembly procedure while the assembly is being assembled. This may the assembler to determine if there is a problem in the assembly while the assembly is being assembled. A user interface may utilize an augmented reality system to show the assembler where any corrections are to be done.

While the assembling of a physical assembly is in progress, the system may be analyzing the progression of the physical assembly, and, accordingly be creating an instance of a digital twin model of an entire machine or large scale assembly that represents the physical assembly condition at any step in the assembly process. The expected results may be provided from the "to be assembled" machine, or template, in a user interface, such as an augmented reality glass (or wearable glasses) on real-time basis.

By way of example, an assembler (person or smart machine) is assembling a generator. To do that, the assembler has to assemble twenty different machine parts. At a particular point in time, the assembler has assembled six machine parts. The system associated with the digital twin model may identify how the six machine parts are physically assembled, and, based on that, how the remaining fourteen machine parts will be assembled. The physical machine parts may have an identifying feature, such as an RFID tag and IoT sensors. This may allow physical twins to be identified uniquely. While any machine or assembly is to be assembled or repaired, then the existing method may be able to identify which machine parts are to be used for assembling. This information may, e.g., be identified from a bill of material. The system accordingly creates a digital twin model for the part instance being assembled and validates at each step along the way whether the assembly of the generator (the instance) is producing expected results versus the template.

If the digital twin model of the machine instance has any deviation in the expected result from the "to be assembled" (or template) machine, then the assembler's display may show, in real time, a progression status of the physical assembly instance so that the assembler may perform a correct assembling of this assembly step of the machine parts before starting assembly of another assembly step of the machine part. For example, if there is a problem in the sixth machine part assembly (e.g., there is a loose fitting), the system, using the digital twin model, may identify the deviation or problem in the final result of the present assembly step (or future steps) (e.g., the magnitude of a vibration). The assembler's display, such as the augmented reality system, may be used to guide the assembler to perform a better assembling of the sixth machine part assembly.

Relevant parts of a machine or assembly may be present as a digital twin model, both for the template and each instance of an assembled part in the digital twin library. Each and every digital twin instance may be identified uniquely. The system may identify which machine parts are assembled and how those machine parts are assembled. Based on the identified quality of assembly of the machine parts, and surrounding context, the digital twin computing system may create a digital twin working model of the machine parts which are already physically assembled. During assembly, the system comprises information about what other parts of the machine are yet to be assembled at a particular point in the assembly process thus what parts are needed to make the assemble complete. In this way, the system may create a complete digital twin model considering the partially physically assembled assembly and the parts yet to be assembled. The digital twin model may be created on a real-time basis based on the progress of the physical assembly, and may simulate the working conditions to calculate the result.

While a real-time digital twin model simulation is created while assembling any machine parts, the system may consider various surrounding assembly parameters and context (e.g., weather, ground hardness, presence of various substances, etc.) and accordingly based on the contextual situation and surrounding parameters, calculate expected results from the simulation results and provide appropriate guidance to the assembler during assembly. For example, if the assembler is assembling the generator on an oily floor, when the generator is physically running, the oily floor may introduce additional vibration. The digital twin system may take into account the context and a simulated result may be created. Here, a detected vibration that may otherwise be unacceptable may be indicated as acceptable due to the detected presence of oil on the floor.

The system may analyze the progressive completed activities. If a problem, such as a misalignment, is identified, the system may provide an indication, such as a haptic or visual effect, to the assembler indicating a potential problem. The haptic effect may be provided to a wearable item of the assembler, or a haptic effect can be provided to the tools used by the assembler for performing the assembly activities. A visual effect may be provided in a user interface, such as a red outlining.

Figure 4:
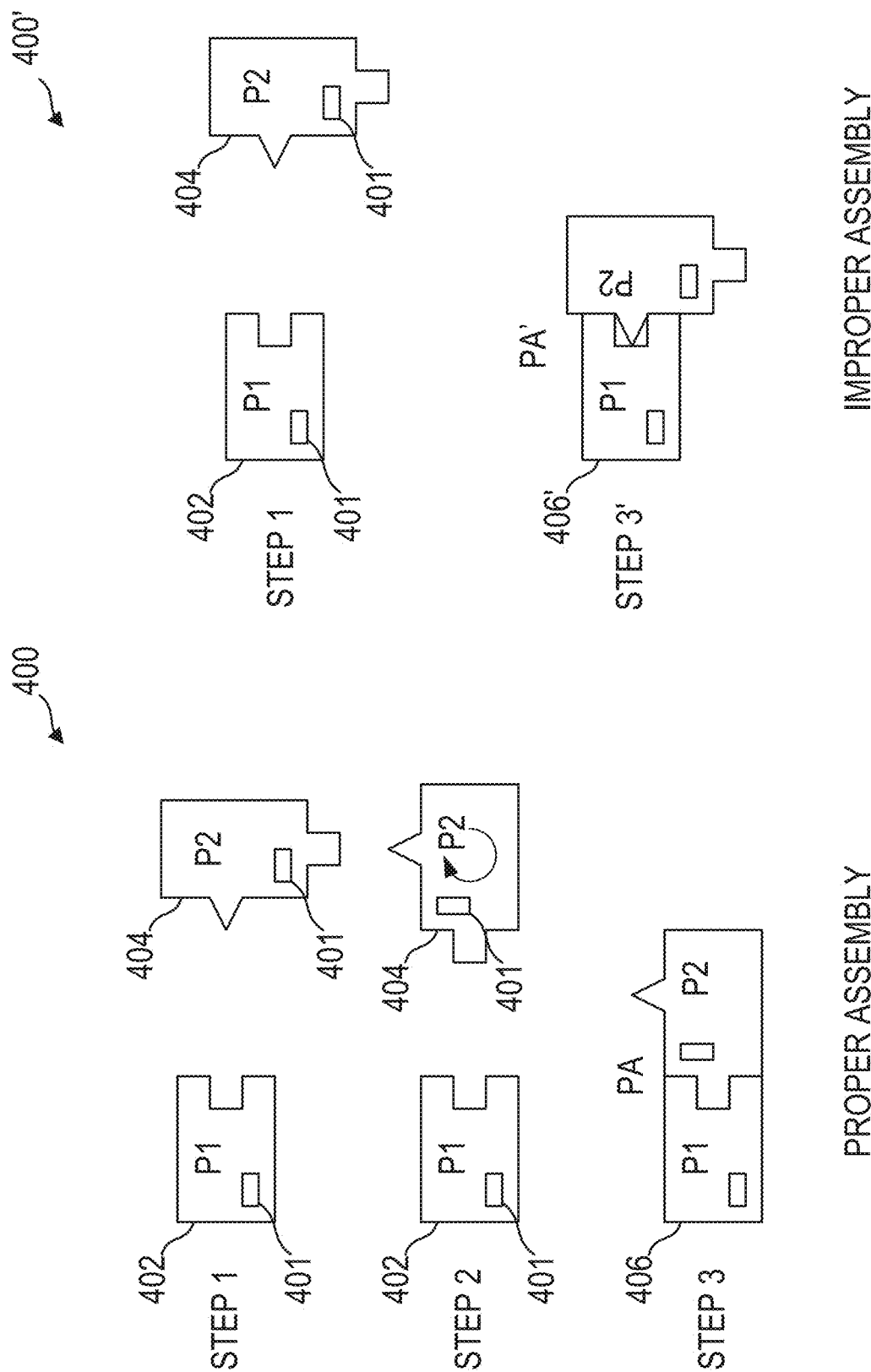
FIG. 4A is a pictorial illustration of various stages of a proper assembly using two parts for an illustrative use case.
FIG. 4B is a pictorial illustration of various stages of an improper assembly using two parts for an illustrative use case.

FIGS. 4A & 4B are pictorial diagrams illustrating a proper and improper assembly formed by two parts. FIG. 4A is a pictorial diagram illustrating an example use case for assembling two hypothetical parts, according to some embodiments. The proper procedure 400 is illustrated by a first part P1 402, and a second part P2 404. In a first step, the labels 401 (or tag) of the first part P1 402 and the second part P2 404 are to be aligned as indicated in the picture so that the parts may be scanned and properly identified. Once the scanning has taken place, the worker assembling the part, in a second step, is to rotate the second part P2 404 90° clockwise. Then, in a third step, the user is to move the two parts P1, P2 together to form a part assembly PA 406, as shown in FIG. 4A.

FIG. 4B is a pictorial diagram illustrating an example use case in which the two parts P1, P2 are improperly assembled by omitting the second step. In the improper procedure 400', the first step is carried out as before, aligning the labels 401 of P1, P2. However, since the second step of rotation is omitted, when the third step is executed of moving the parts together, the parts P1, P2 produce a mis-assembled assembly PA' 406'.

Figure 5:
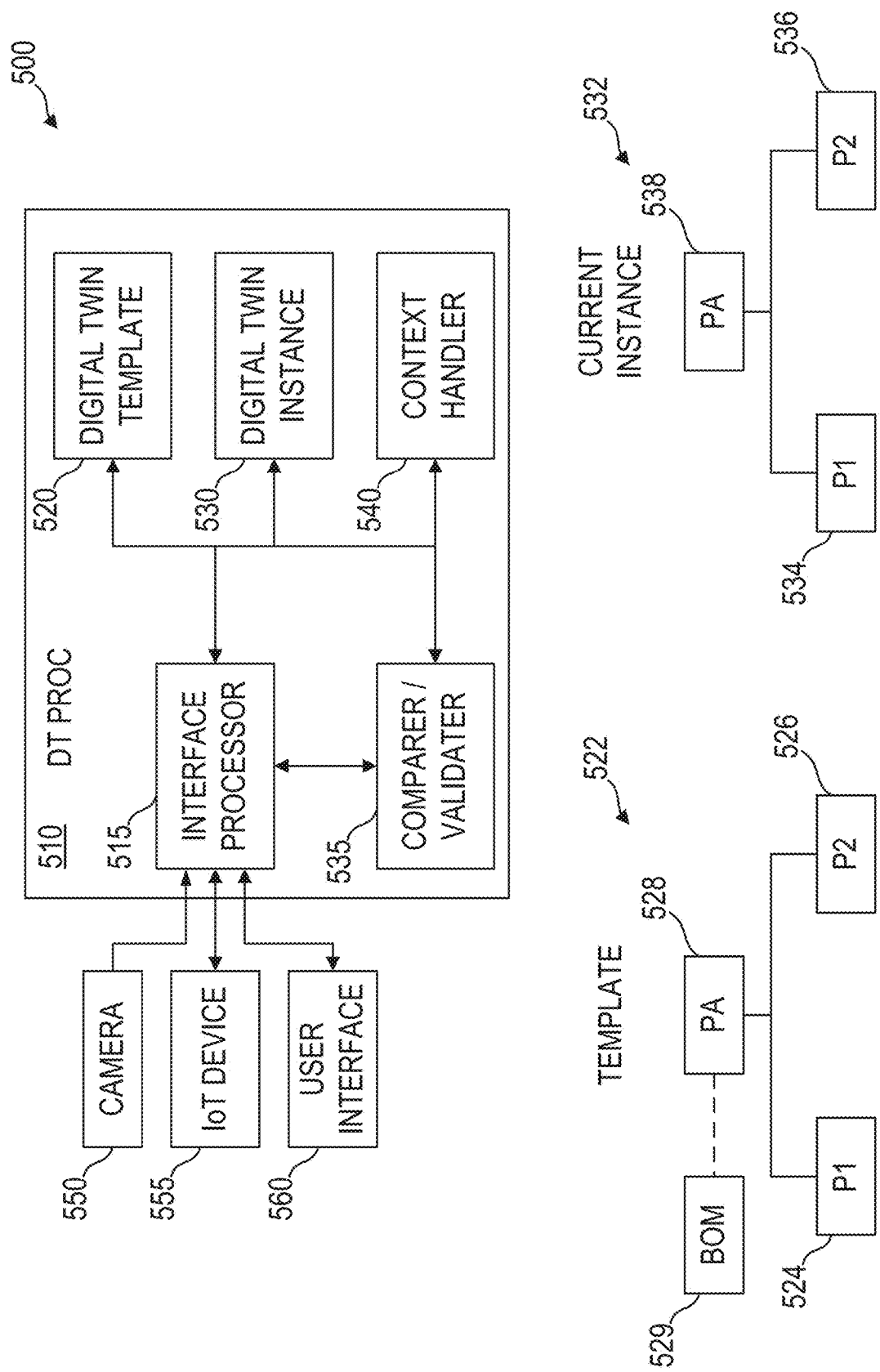
FIG. 5 is a block diagram illustrating an example of a digital twin system, according to some embodiments.

FIG. 5 is a block diagram of an example digital twin system 500, according to some embodiments. A digital twin processor (DTP) 510 may be a DPS 100, as described above. Some or all of the parts of the DTP 510 may reside in the vicinity of the assembly process, or may be located remotely on a server or within a network service. Databases, such as the digital twin template database 520 and the digital twin instance database 530, as well as operational components, may reside in a cloud on the network, such as the cloud computing environment 50 discussed above. The DTP 510 may comprise an interface processor 515 that receives and sends information to external devices that may be utilized in the assembly process.

FIG. 5 illustrates some examples of these external devices, however, these are by way of example and do not preclude the use of other devices. A camera 550 may be utilized to image the assembly process as it moves forward. Although the IoT devices 555 are shown separately, the camera 550 may also be an IoT device (as may be the user interface 560, discussed below). The camera 550 may produce image and/or video data that may be interpreted in the DTP 510, and it may be of a high enough resolution and positioned such that precise measurements may be made—such precise measurements may be at a level by which specific tolerances of the parts or various part features may be determined. By way of example, in FIG. 4, the camera 550 may be utilized to determine that Step 2 was not performed and that P2 has not been oriented properly by looking at the placement of the different shaped protrusions or noting gaps in the assembled part PA.

IoT devices 555, such as a part identifier scanner, may be utilized. Such a scanner may can barcode, QR, or other identifying labels that may be present on a part (although it is possible through image recognition that the part may be identified by its shape in the image). The IoT devices 555 may include other forms of measuring instruments to help ensure that the assembly is proper. For example, an IoT torque wrench may help assure that bolts are tightened by a proper amount during the assembly, or ultrasound scanning may assure a tight fit between parts. The IoT devices 555 may include any form of measuring or sensing devices used during the assembly process.

The external devices may further comprise a user interface 560 via which the assembly and the DTP 510 may communicate. In some embodiments, such a user interface 560 may comprise an augmented reality (AR) mechanism, such as a transparent display screen or a user wearable, such as AR glasses. This display may provide assembly instructions to the assembler, indicating next steps, confirming proper assembly, or flagging problems to the assembler. It is generally better to indicate problems or potential problems to the assembler sooner, rather than later.

In one illustrative example, the assembler may have a bad part (e.g., P1) as one of the components to the assembly. The part P1 may not be in conformance with required specifications, and the camera 550 may send image information to the DTP 510 that detects the non-conformance of the part. As the assembler attempts to place the part next to the other part in the assembly (e.g., P2), the DTP 510 may send information to the AR glasses 560 worn by the assembler highlighting an outline of the bad part P1 in red, and displaying a message that this part does not meet the required tolerances and therefore may be a faulty part. The assembler may thus be able to resolve the problem by getting a new part P1, rather than creating the assembly PA, only to have the bad part P1 discovered at a later point in the assembly process (at which point it may be much more expensive and time consuming to resolve). The interface processor 515 may be used to receive information from the camera 550 and share information with the IoT devices 555 and user interface 560, performing conversions and transformations in the process.

The comparer/validator 535 may track, in real time, the assembly process, by accessing a digital twin template 522 that may be stored in a digital twin template database 520, containing the digital twin information for a given step or series of steps, and respective parts needed in the assembly process. This information in the template may have been created during a training phase or at least provided for a production part that ended up as being properly assembled. This serves as an exemplar of a properly executed assembly process to produce a properly assembled part. As can be seen in the assembly template 522, the parts P1 524, and P2 526 are provided, each having a definition of related information associated with them and stored with the template. The assembled part PA 528 is also provided and may contain the assembly instructions for the constituent parts P1, P2 that go into making it. The assembly PA 528 may contain or at least be associated with a bill of material (BOM) 529 needed to assemble the assembly PA 528.

The digital twin instance database 530 may contain current part instances 532 of a specific assembly being worked on. It may have entities corresponding to parts in the template that are used by the specific part being produced in the assembly. For example, the current instance parts P1 534 and P2 536 and assembly PA 538 correspond to respective template parts P1 524 and P2 526 and assembly PA 528. As the assembly process proceeds through its steps, the comparer/validator 535 repeatedly compares the current instance data of the assembly PA 538 being produced with the data from the template. Any variance between the two may be determined. If the variance exceeds some predefined threshold, an alert may be provided to the assembly in the manner described above. The variance may be expressed in terms of an absolute measure (e.g., a gap that exceeds 0.030"), standard deviations (e.g., >1.5σ), or any other computationally determinable form.

A context handler 540 may be used to make adjustments for the comparer/validater 535 that are context dependent.

For example, even though the variance of a specific portion of the assembly or part itself does not exceed a threshold, it may contribute to an overall variance threshold that might ultimately prove unacceptable. For example, a displacement of a part in an assembly of 0.020" from where it should be may not exceed the 0.050" threshold for the assembly as a whole, and thus not trigger an alert. However, this may mean that another portion of the assembly may only be able to tolerate 0.030" (as opposed to the whole 0.050") variance. Thus, data collected from an earlier step in the assembly process may impact the assembly of later steps.

The context handler may be able to take other aspects of context into account as well. For example, temperature in the assembly area may have an effect on various dimensions where tight tolerances are required. Thus, the context handler 540 may be able to factor in a sensed temperature and make appropriate adjustments for the comparer/validator 535.

Figure 6:
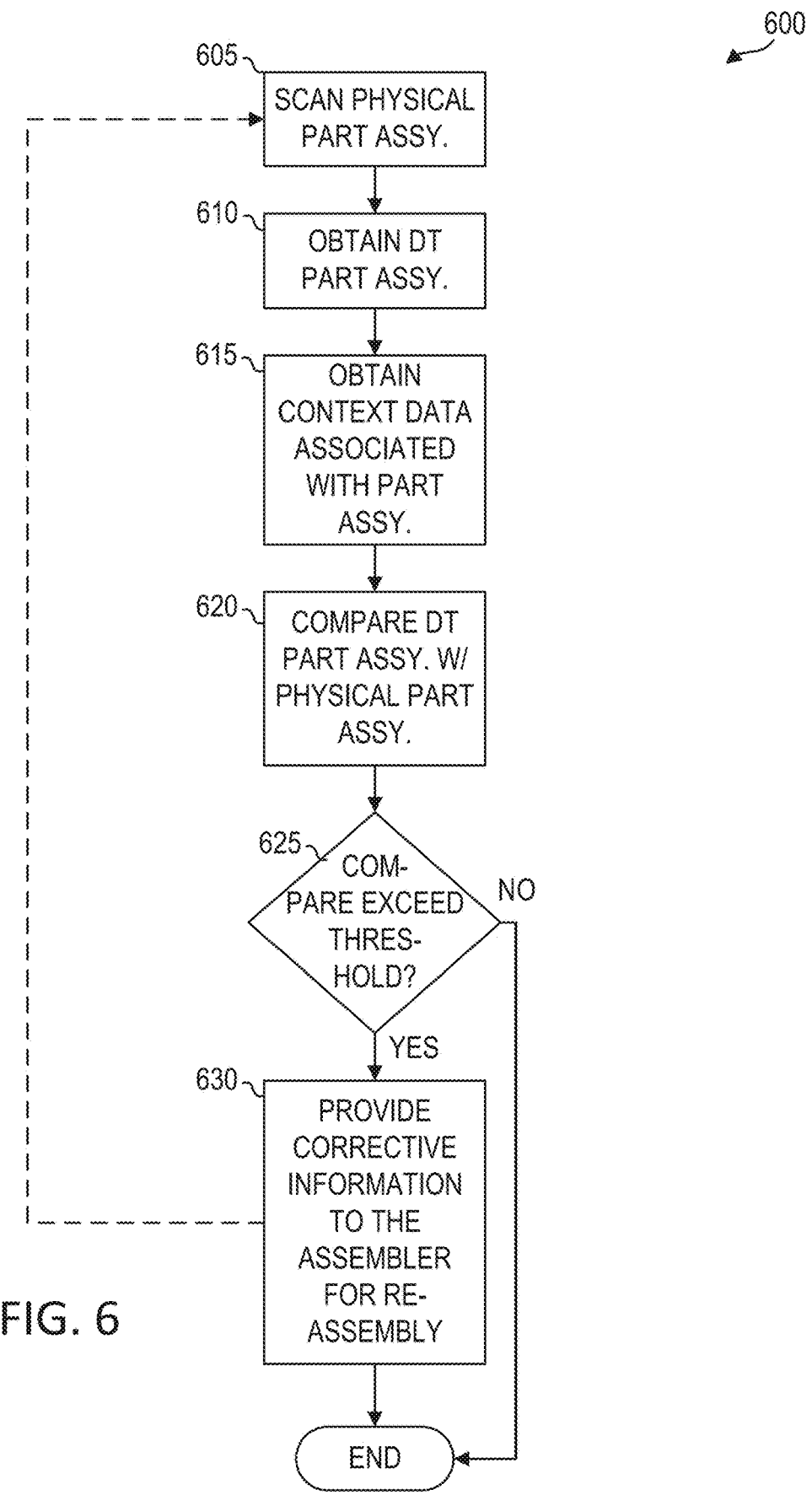
FIG. 6 is a flowchart of an example process according to one or more embodiments disclosed herein.

FIG. 6 is a flowchart that illustrates a process 600 according to some embodiments. In sum, the computer implemented process 600 comprises scanning, with a sensor 550, 555, an instance that is the physical part assembly PA 538 produced by assembling, by the assembler, the first physical part P1 534 with a second physical part P2 536 to produce physical part assembly data PA 538, obtaining digital twin part assembly data PA 528 of a correctly assembled physical part assembly PA from a template that corresponds to the physical part assembly PA, obtaining context data associated with a context within which the physical part assembly PA is produced, comparing the digital twin part assembly data PA 528 with the physical part assembly data PS 538 and incorporating the context data to determine whether a deviation measured by the comparison exceeds a threshold, and responsive to the deviation exceeding a threshold, providing corrective information via the user interface 560 to the assembler for re-assembling the first physical part P1 534 to the second physical part P2 536 to produce a reassembled physical part assembly PA 538 based on the corrective information.

In operation 605, a scanning device 550, 555 may scan a physical part assembly that has been scanned by, e.g., an imaging system 550 and that will form template data defining a correctly assembled assembly PA 528. The physical part assembly PA 528 has been previously assembled from a first part P1 524 and a second part P2 526 that thereby produces the physical part assembly PA 528. In operation 610, the system may obtain a digital twin of the part assembly PA 528 as the template. Such a digital twin template illustrates a correctly assembled part. The template data used as a standard may have been scanned from a previously assembled part, as described above, or may have been digitally created and verified as correctly assembled without actually scanning a physical part.

In operation 615, context data may be obtained that is associated with the assembly operation of the physical part assembly. Such context data may be obtained via the camera 550 and the IoT devices 555, and may include physical conditions, such as temperature, ground hardness, the presence of other substances, etc. This data may be taken into account by the context handler 540, as described above. In operation 620, the system may compare, using the comparer/validater 535, the digital twin part assembly of the template PA 528 with the scanned physical part assembly of the part instance being assembled PA 538 to determine variances between the two. Such a comparison may incorporate the context information when making the comparison. Thus, depending on the context, an assembly that may exceed threshold limits under a first set of conditions might not exceed threshold limits under a second set of conditions.

In operation 625, a determination is made as to whether the comparison results exceed a predefined threshold. If not (625: NO), then the physical part may be consider as correctly assembled and this step of the assembly process is considered successfully completed. If the predefined threshold is exceeded (625: YES), then in operation 630, corrective information may be provided to the assembler so that re-assembly of the physically assembled part may be performed. This process 600 may be repeated until an acceptably created part is produced or until some other termination criteria is met.

Computer Technology and Computer Readable Media

The one or more embodiments disclosed herein accordingly provide an improvement to computer technology, namely, the computer technology used to support manufacturing operations. For example, an improvement to a manufacturing computer database and the associated data structures and comparative operations allow the computer to operate more efficiently in support of a manufacturing process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A non-transitory computer implemented method, comprising:
    receiving digital twin instance part assembly information (IPAD) from a sensor scan of a physical part assembly produced by assembling a first physical part with a second physical part;
    receiving digital twin framework part assembly data (FPAD) representing a correctly assembled physical part assembly and that corresponds to the physical part assembly;
    receiving context data associated with a context within which the physical part assembly is produced;
    comparing the FPAD with the IPAD, utilizing the context data, to determine whether a deviation of the IPAD from the FPAD exceeds a threshold; and
    responsive to the deviation exceeding a threshold, providing corrective information to a device of an assembler for re-assembling the first physical part to the second physical part to produce a reassembled physical part assembly based on the corrective information.

2. The method of claim 1, wherein the context data is information obtained by sensors about an area in which the physical part assembly was produced.

3. The method of claim 2, wherein the context data includes data selected from the group consisting of weather data, ground hardness data, and substance data.

4. The method of claim 1, wherein the providing of corrective information to the assembler comprises displaying corrective information to an augmented reality device worn by the assembler or producing haptic feedback to a haptic device in contact with the assembler.

5. The method of claim 4, wherein the displaying of the corrective information comprises displaying expected and calculated results from a simulation to the assembler during assembling.

6. The method of claim 1, wherein the comparing of the FPAD with the IPAD comprises:
    converting image data from a camera into instance feature measurement data; and
    comparing the instance feature measurement data to corresponding framework feature measurement data;
    wherein the threshold is a tolerance distance.

7. The method of claim 1, further comprising receiving uniquely identifying information of both the first and second parts.

8. The method of claim 1, wherein FPAD collected in an earlier assembly step is utilized in the comparing of a current assembly step.

9. A part assembly system, comprising:
a processor configured to:
   receive digital twin instance part assembly information (IPAD) from a sensor scan of a physical part assembly produced by assembling a first physical part with a second physical part;
   receive digital twin framework part assembly data (FPAD) representing a correctly assembled physical part assembly and that corresponds to the physical part assembly;
   receive context data associated with a context within which the physical part assembly is produced;
   compare the FPAD with the IPAD, utilizing the context data, to determine whether a deviation of the IPAD from the FPAD exceeds a threshold; and
   responsive to the deviation exceeding a threshold, provide corrective information to a device of an assembler for re-assembling the first physical part to the second physical part to produce a reassembled physical part assembly based on the corrective information.

10. The system of claim 9, wherein the context data is information obtained by sensors about an area in which the physical part assembly was produced.

11. The system of claim 10, wherein the context data includes data selected from the group consisting of weather data, ground hardness data, and substance data.

12. The system of claim 9, wherein the provision of corrective information to the assembler causes the processor to provide data to display corrective information to an augmented reality device worn by the assembler or produce haptic feedback to a haptic device in contact with the assembler.

13. The system of claim 12, wherein the display of the corrective information causes the processor to provided data to display expected and calculated results from a simulation to the assembler during assembling.

14. The system of claim 9, wherein the comparison of the FPAD with the IPAD causes the processor to:
   convert image data from a camera into instance feature measurement data; and
   compare the instance feature measurement data to corresponding framework feature measurement data;
   wherein the threshold is a tolerance distance.

15. The system of claim 9, wherein FPAD collected in an earlier assembly step is utilized in the comparison of a current assembly step.

16. A computer program product for search modification system, the computer program product comprising non-transitory a computer readable storage medium having computer-readable program code embodied therewith to, when executed on a processor:
   receive digital twin instance part assembly information (IPAD) from a sensor scan of a physical part assembly produced by assembling a first physical part with a second physical part;
   receive digital twin framework part assembly data (FPAD) representing a correctly assembled physical part assembly and that corresponds to the physical part assembly;
   receive context data associated with a context within which the physical part assembly is produced;
   compare the FPAD with the IPAD, utilizing the context data, to determine whether a deviation of the IPAD from the FPAD exceeds a threshold; and
   responsive to the deviation exceeding a threshold, provide corrective information to a device of an assembler for re-assembling the first physical part to the second physical part to produce a reassembled physical part assembly based on the corrective information.

17. The non-transitory computer program product of claim 16, wherein the context data is information obtained by sensors about an area in which the physical part assembly was produced.

18. The non-transitory computer program product of claim 17, wherein the context data includes data selected from the group consisting of weather data, ground hardness data, and substance data.

19. The non-transitory computer program product of claim 16, wherein the provision of corrective information to the assembler causes the processor to provide corrective information to an augmented reality device worn by the assembler or produce haptic feedback to a haptic device in contact with the assembler.

20. The non-transitory computer program product of claim 19, wherein the data for the display of the corrective information comprises data to display expected and calculated results from a simulation to the assembler during assembling.

* * * * *